(12) United States Patent
Wang et al.

(10) Patent No.: US 9,157,727 B2
(45) Date of Patent: Oct. 13, 2015

(54) IMAGE MEASURING METHOD AND IMAGE MEASURING APPARATUS

(71) Applicant: KABUSHIKI KAISHA TOPCON, Toyko (JP)

(72) Inventors: Zhenguo Wang, Fort Lee, NJ (US); Zhijia Yuan, River Edge, NJ (US); Kinpui Chan, Ridgewood, NJ (US)

(73) Assignee: KABUSHIKI KAISHA TOPCON, Tokyo (JP)

( * ) Notice: Subject to any disclaimer, the term of this patent is extended or adjusted under 35 U.S.C. 154(b) by 107 days.

(21) Appl. No.: 14/031,570

(22) Filed: Sep. 19, 2013

(65) Prior Publication Data

US 2014/0204386 A1   Jul. 24, 2014

Related U.S. Application Data

(60) Provisional application No. 61/754,275, filed on Jan. 18, 2013.

(51) Int. Cl.
*G01B 11/02* (2006.01)
*G01B 9/02* (2006.01)

(52) U.S. Cl.
CPC ........ *G01B 9/02091* (2013.01); *G01B 9/02004* (2013.01); *G01B 9/02069* (2013.01)

(58) Field of Classification Search
CPC ........... G01B 9/02004; G01B 9/02064; G01B 9/02069
USPC ........................................................ 356/497
See application file for complete search history.

(56) References Cited

U.S. PATENT DOCUMENTS

| | | | | |
|---|---|---|---|---|
| 8,049,900 B2 * | 11/2011 | Kemp et al. | ................... | 356/497 |
| 8,581,643 B1 * | 11/2013 | Schmitt | ......................... | 327/156 |
| 2008/0175465 A1 * | 7/2008 | Jiang et al. | .................... | 382/131 |
| 2012/0013914 A1 | 1/2012 | Kemp | | |
| 2012/0277579 A1 * | 11/2012 | Sharma et al. | ................ | 600/425 |

FOREIGN PATENT DOCUMENTS

JP         2013-181790 A         9/2013

OTHER PUBLICATIONS

Extended European Search Report issued in Application No. 13004839.0 dated Dec. 6, 2013.
Sayiner, Necip, Henrik V. Sorenson, and Thayamkulangara R. Viswanathan. "A level-crossing sampling scheme for A/D conversion", Circuits and Systems II: Analog and Digital Signal Processing, IEEE Transactions on, 43.4 (Apr. 1996): 335-339.

* cited by examiner

*Primary Examiner* — Jonathan Hansen
(74) *Attorney, Agent, or Firm* — Pearne & Gordon LLP

(57) ABSTRACT

An image measuring method according to an embodiment comprises a clock generating step, a noise reducing step, a data acquisition step, a digital data generating step and an image data generating step. In the clock generating step, clock signals are generated. In the noise reducing step, the noise of the generated clock signals is reduced to a predetermined threshold or lower. In the data acquisition step, analog data indicating the inner morphology of an object is acquired. In the digital data generating step, digital data is generated by sampling the analog data based on the clock signals with reduced noise. In the image data generating step, image data of the object is generated by performing data processing including Fourier transform on the generated digital data.

13 Claims, 14 Drawing Sheets

IMAGE MEASURING METHOD AND IMAGE MEASURING APPARATUS

This application is based upon and claims the benefit of priority from U.S. Provisional Patent Application No. 61/754,275, filed on Jan. 18, 2013; the entire contents of which are incorporated herein by reference.

TECHNICAL FIELD

The present invention relates to an image measuring method and an image measuring apparatus that image an object.

BACKGROUND TECHNOLOGY

Optical coherence tomography (abbreviated OCT) is an example of an image measuring method. OCT is a technique in which interference light between a signal light via an object and a reference light is detected and a tomographic image of the object is formed. OCT is used in the medical field etc. due to the advantage that it provides high resolution images quickly and non-invasively.

The main advancement regarding this technique includes Fourier domain OCT (abbreviated FD-OCT). In FD-OCT, by means of using a Fourier transform method, measurement speed several tens to several hundred times faster may be accomplished compared to the conventional time domain OCT (abbreviated TD-OCT).

FD-OCT includes a spectral domain OCT (abbreviated SD-OCT) that spectrally resolves and detects interference light, along with a swept source OCT (abbreviated SS-OCT) that uses a swept source to obtain interference lights of various wavelengths.

Generally, the image measuring method uses electromagnetic waves etc. to acquire analog data indicating the inner morphology of the object and processes signals obtained by digitalizing the acquired data, thereby imaging the object. The image measuring apparatus for realizing this is mounted with a digital signal processing system such as a data acquisition system (abbreviated DAS).

Analog signal sampling and A/D transformation are executed with a sampling clock signal as the trigger thereof. In the image measuring method using a Fourier transform method, the stability of the sampling clock signal greatly affects the measurement results. Hereinafter, the sampling clock signal may be simply abbreviated as the clock signal.

To illustrate an example, a case of FD-OCT is explained. In FD-OCT, the detected spectrum, that is, the spectral interferogram (interference spectrum) is expressed by the following formula.

[Formula 1]

$$I(k) = s(k) \cdot \left( I_R + I_S + \int_{-\infty}^{+\infty} 2\sqrt{I_R I_S} \cos(kz + \phi_0(z)) dz \right) \quad (1)$$

Where, k indicates the wave number, s(k) indicates the light source spectrum, z indicates the difference in optical-path-length between a sample arm and a reference arm, $I_R$ indicates the back reflection intensity of a reference light by a reference mirror, $I_S$ indicates the signal light intensity having passed the object, while $\phi_0(z)$ indicates the initial spectral phase term. Generally, $I_R$ and $I_S$ are low frequency signals or a background component (DC component), which may be easily removed. Thereby, the Formula (1) is simplified as follows.

[Formula 2]

$$I(k) = \int_{-\infty}^{+\infty} A(z) \cos(kz + \phi_0(z)) dz \quad (2)$$

Where, $A(z)=s(k) \cdot 2\sqrt{(I_R I_S)}$ indicates the amplitude of the interference signal proportionate to the back scattering intensity of the object at a depth z. By means of performing Fourier transform of I (k) based on Formula (2), the backscattering profile of the object at depth z, that is, an A-line profile may be reconstructed.

Regarding SS-OCT, the ideal morphology of a spectral interferogram waveform corresponding to depths z=d1, d2, and d3 as well as the ideal morphology of the signals obtained from performing Fourier transform on these are illustrated in FIG. 1. Meanwhile, an example of actually acquired signals is illustrated in FIG. 2. A signal 1000 includes a signal component 1001 corresponding to actual signals and an artifact component (side peaks) 1002. The artifact component 1002 restricts the dynamic range, causing deterioration of image quality.

As illustrated in FIG. 3, a clock signal 2000 includes a timing component 2001 indicating the timing of the trigger in addition to a noise component (clock noises) 2002. The artifact component 1002, as illustrated in FIG. 2, is generated by such clock noise 2002.

The method for generating clock signals is explained. For example, in SS-OCT, dedicated clock signals are used in order to linearly sample the spectral interferogram in a k-space. A configuration for generating these clock signals is illustrated in FIG. 4.

Light output from the swept source 3010 is input into an interferometer 3030 via an optical fiber 3020. The interferometer 3030 has a specific difference in optical-path-length. That is, an optical delaying part 3033 is, for example, configured with a fiber stretcher, providing a difference in optical-path-length between a path via the optical fibers 3032 and 3034 and a path via an optical fiber 3035.

Light input into the interferometer 3030 is divided into two by a fiber coupler 3031. One of the lights is lead to the optical delaying part 3033 via the optical fiber 3032 to receive a specified amount of phase delay, and then lead to the fiber coupler 3036 via the optical fiber 3034. The other light is lead to the fiber coupler 3036 via the optical fiber 3035. The fiber coupler 3036 causes the two lights to interfere. The generated interference light comprises a frequency corresponding to the amount of the phase delay. This interference light is detected by the photodetector 3050 via the optical fiber 3040.

Signals output from the photodetector 3050 are input to an amplifier 3070 via the signal line 3060. The amplifier 3070 amplifies the output signals of the photodetector 3050. The signals output from the amplifier 3070 are the clock signals 4000 illustrated in FIG. 5. The clock signals 4000 are used as the trigger signals for linear sampling of the spectral interferogram in the k-space.

As mentioned above, the interferometer 3030 comprises a constant difference Δz in optical-path-length. The difference Δz in optical-path-length is set in accordance with a request from the sampling resolution. The sampling resolution Δk is defined as the inverse number of the difference Δz in optical-path-length: Δk=1/Δz.

Moreover, the clock signal $S_n$ corresponding to a sampling point is expressed as follows:

$$S_n = A \cdot \cos(2\pi \cdot \Delta z \cdot k_n + \phi) = A \cdot \cos(2\pi \cdot n + \phi) = A \cdot \cos(\phi).$$

As can be seen from this formula, the sampling of the spectral interferogram is preferably performed at the point where the instantaneous phase of the clock signal $S_n$ becomes constant. Particularly, taking into consideration the fact that there are no affects due to signal amplitude and light intensity, it is believed that a zero-cross point of the clock signal is most preferable. Symbols 4010$j$ (j=1, 2, 3, ...) in FIG. 6 illustrate the zero-cross points of the clock signal 4000. Such zero-cross points 4010$j$ are zero-cross points at the rising edge of the clock signal 4000. In such case, the value of $\phi$ in the clock signal $S_n$ becomes $\phi = 3\pi/2$.

PRIOR ART DOCUMENT

Non-Patent Documents

[Non-patent Document 1] Sayiner, Necip, Henrik V. Sorensen, and Thayamkulangara R. Viswanathan. "A level-crossing sampling scheme for A/D conversion. "*Circuits and Systems II: Analog and Digital Signal Processing, IEEE Transactions on* 43.4 (1996): 335-339

SUMMARY OF THE INVENTION

Problem to be Solved by the Invention

The purpose of the present invention is to suppress image artifacts caused by noises in clock signals.

Means for Solving the Problem

The invention described in Claim 1 is an image measuring method comprising: a clock generating step that generates clock signals; a noise reducing step that reduces the noise of the generated clock signals to a predetermined threshold or lower; a data acquisition step that acquires analog data indicating the inner morphology of an object; a digital data generating step that samples the analog data based on the clock signals with reduced noise to generate digital data; and an image data generating step that performs data processing including Fourier transform on the generated digital data, thereby generating image data of the object.

The invention described in Claim 2 is the image measuring method according to Claim 1, further comprising a threshold determining step that determines the threshold based on intensity information indicating the correspondence between the noise intensity and the image artifact intensity of clock signals obtained in advance.

The invention described in Claim 3 is the image measuring method according to Claim 2, wherein the threshold determining step comprises the steps of: determining a reference value of the image artifact intensity based on the dynamic range value set in advance; and obtaining noise intensity corresponding to the reference value based on the intensity information; wherein the obtained noise intensity is set as the threshold.

The invention described in Claim 4 is the image measuring method according to Claim 3, wherein the reference value is a value of the dynamic range value with a negative sign.

The invention described in Claim 5 is the image measuring method according to Claim 2, wherein the intensity information is generated based on the signals corresponding to the maximum depth position of an imaging range in the depth direction that is set in advance.

The invention described in Claim 6 is the image measuring method according to Claim 1, wherein the noise reducing step is performed using a filter that reduces the signal intensity in the frequency range of the noise component of the clock signals to the threshold or lower, while not reducing the signal intensity in the frequency range of the signal component.

The invention described in Claim 7 is the image measuring method according to Claim 1, wherein in the data acquisition step, light output from a swept source is divided into signal light and reference light, interference light between the signal light via the object and the reference light is generated, and the interference light is detected to obtain the analog signal.

The invention described in Claim 8 is the image measuring method according to Claim 1, wherein in the data acquiring step, light output from a broadband light source is divided into signal light and reference light, interference light between the signal light via the object and the reference light is generated, the interference light is spectrally resolved, and its spectrum distribution is detected to obtain the analog signal.

The invention described in Claim 9 is an image measuring apparatus, comprising: a clock generating part configured to generate clock signals; a noise processing part configured to reduce the noise of the generated clock signals to the predetermined threshold or lower; a data acquisition part configured to acquire analog data indicating the inner morphology of the object, and to sample the analog data based on the clock signals with reduced noise to generate digital data; and an image data generating part configured to perform data processing including Fourier transform on the generated digital data, thereby generating image data of the object.

The invention described in Claim 10 is the image measuring apparatus according to Claim 9, wherein the threshold is determined based on intensity information indicating the correspondence between the noise intensity and the image artifact intensity of clock signals obtained in advance.

The invention described in Claim 11 is the image measuring apparatus according to Claim 10, further comprising a threshold determining part configured to determine the threshold based on the intensity information.

The invention described in Claim 12 is the image measuring apparatus according to Claim 11, wherein the threshold determining part comprises: a reference value setting part configured to set a reference value of the image artifact intensity based on the dynamic range value set in advance; and a noise intensity acquiring part configured to acquire noise intensity corresponding to the reference value based on the intensity information; wherein the threshold determining part sets the acquired noise intensity as the threshold.

The invention described in Claim 13 is the image measuring apparatus according to Claim 12, wherein the reference value setting part sets a value of the dynamic range value with a negative sign as the reference value.

The invention described in Claim 14 is the image measuring apparatus according to Claim 10, wherein the intensity information is generated based on the signals corresponding to the maximum depth position of an imaging range in the depth direction that is set in advance.

The invention described in Claim 15 is the image measuring apparatus according to Claim 9, wherein the noise processing part uses a filter that reduces the signal intensity in the frequency range of the noise component of the clock signals to the threshold or lower, while not reducing the signal intensity in the frequency range of the signal component, thereby reducing the noise in the clock signals.

The invention described in Claim 16 is the image measuring apparatus according to Claim 9, wherein the data acquisition part comprises: a swept source; an interference optical system configured to divide light output from the swept source into signal light and reference light, and generate interference light between the signal light via the object and the reference light; and a photoelectric conversion element configured to detect the interference light and generate analog signals.

The invention described in Claim 17 is the image measuring apparatus according to Claim 9, wherein the data acquisition part comprises: a broadband light source; an interference optical system configured to divide light output from the broadband light source into signal light and reference light, and generate interference light between the signal light via the object and the reference light; and a spectrometer configured to spectrally resolve the interference light and detect the spectrum distribution thereof to generate analog signals.

Effect of the Invention

According to the present invention, it is possible to suppress image artifacts caused by noises in clock signals.

MODE FOR CARRYING OUT THE INVENTION

Figure 1:
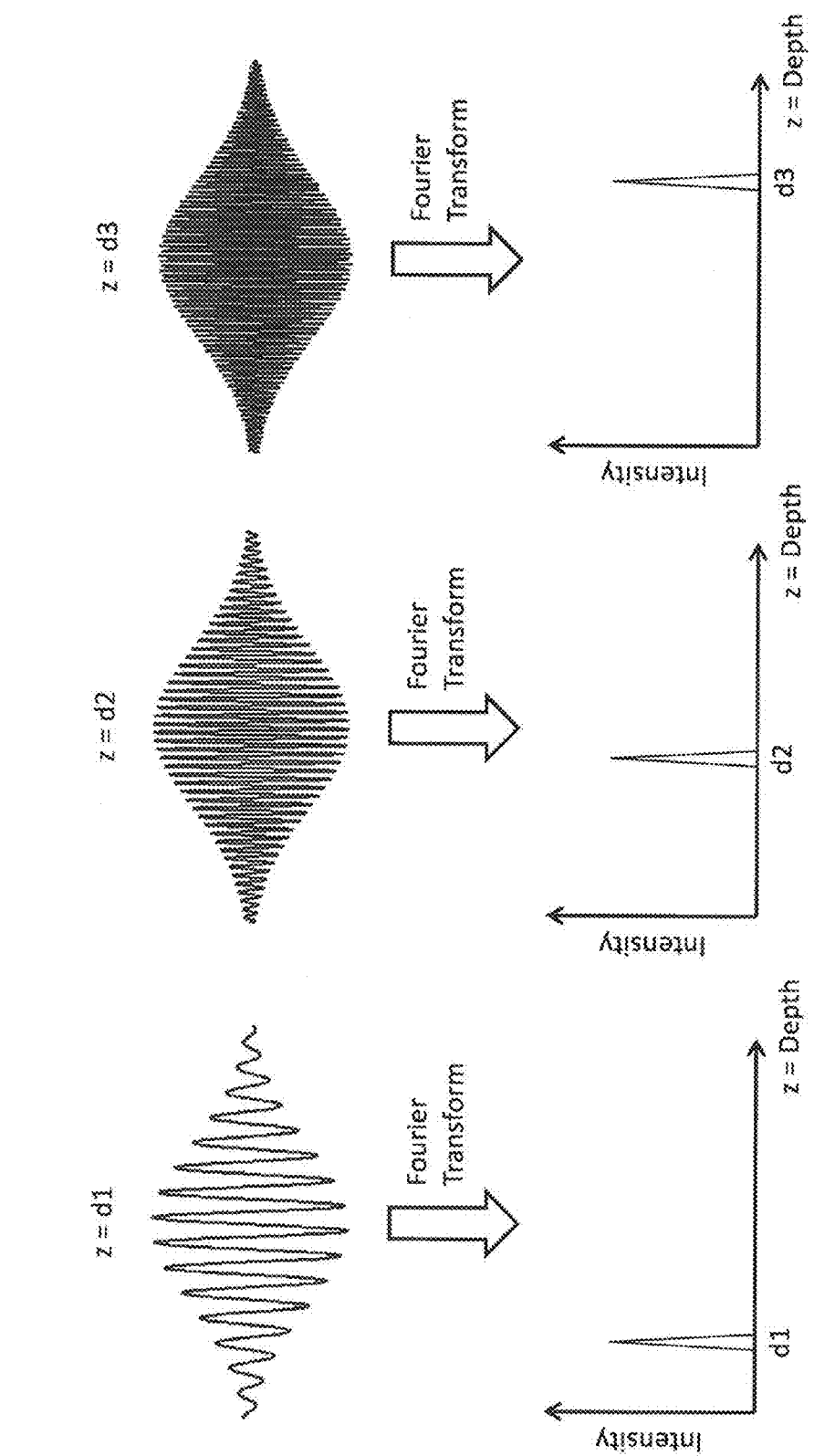
FIG. 1 is a diagram for explaining a conventional technology.

An example of an embodiment of the present invention is explained with reference to the drawings. It should be noted that the contents of the documents cited in this specification may be employed in the following embodiments. Hereinafter, a case of applying the present invention to SS-OCT is described; however, similar technique may be applied for any kinds of image measuring method and image measuring apparatus using Fourier transform.

Outline of the Embodiment

Although the details are mentioned later, the inventors discovered that the occurrence locations and intensities of image artifacts attributed to clock signals are determined by the properties (frequency distribution and intensity) of the clock noise. In the embodiment, a clock noise suppressing method that is based on these findings is employed for quantitatively suppressing the artifacts. According to this method, it becomes possible to suppress the artifacts in accordance with the dynamic range required for image measurement.

<Principle>

The symbols used in the embodiments are defined as follows.

n: Index of N number of sampling points (n=1, 2, 3, ..., N)

$A_S$: Amplitude of a spectrum interference signal $S_n$: Sampled signals $f_{signal}$: Frequency of the signal $S_n$ $\Delta k$: Sampling interval (wave-number expression)

$k_n$: Sampling point (wave-number expression)

$A_{noise}$: Amplitude of the clock noise normalized to a main clock $f_{noise}$: Clock noise frequency $I_{noise}$: Clock noise intensity, $I_{noise}=20 \log_{10}(A_{noise})$ (dB)

$f_{Sample}$: Clock signal frequency $I_{artifact}$: Artifact intensity normalized to a main signal peak (unit dB)

$R_{dynamic}$: Dynamic range of a system $D_{max}$: Maximum depth in the imaging range $Z_{max}$: Effective imaging range in the depth direction $I_{noise, thresh}$: Clock noise threshold for suppressing artifacts (unit dB)

$Z_{signal}$: Signal depth in an image

Ideally, when the wave number k is linearly scanned with respect to time, the spectral interferogram $S(k)=A_S \cdot \cos(2\pi \cdot Z_{signal} \cdot k + \phi)$ of SS-OCT is acquired by the following formula with respect to the time t: $S(t)=A_S \cdot \cos(2\pi \cdot f_{signal} \cdot t + \phi)$. Here, the time t is proportional to the wave number k, while the frequency $f_{signal}$ is proportional to the depth $Z_{signal}$. According to Nyquist-Shannon sampling theorem, the maximum imaging depth $D_{max}$ is determined by the half-value "$f_{sample}/2$" of the frequency $f_{sample}$ (that is, the sampling frequency) of the clock signals.

When a DAS is used for acquiring N number of sampling points in SS-OCT signals from the signal scattering surface of the depth $Z_{signal}$, the sampled signals may be expressed as follows: $S_n=A_S \cdot \cos(2\pi \cdot Z_{signal} \cdot k_n + \phi)$. Here, n=1, 2, 3, ..., N, and $k_n=n\Delta k$ ($\Delta k$: wave number expression of the sampling interval), and $\phi$ is the initial phase. By performing Fourier transform on $S_n$, the A-line profile (axial direction profile) may be obtained. A 2-dimensional tomographic image of the object may be formed using a plurality of A-line profiles acquired for different positions along the transverse direction.

Figure 2:
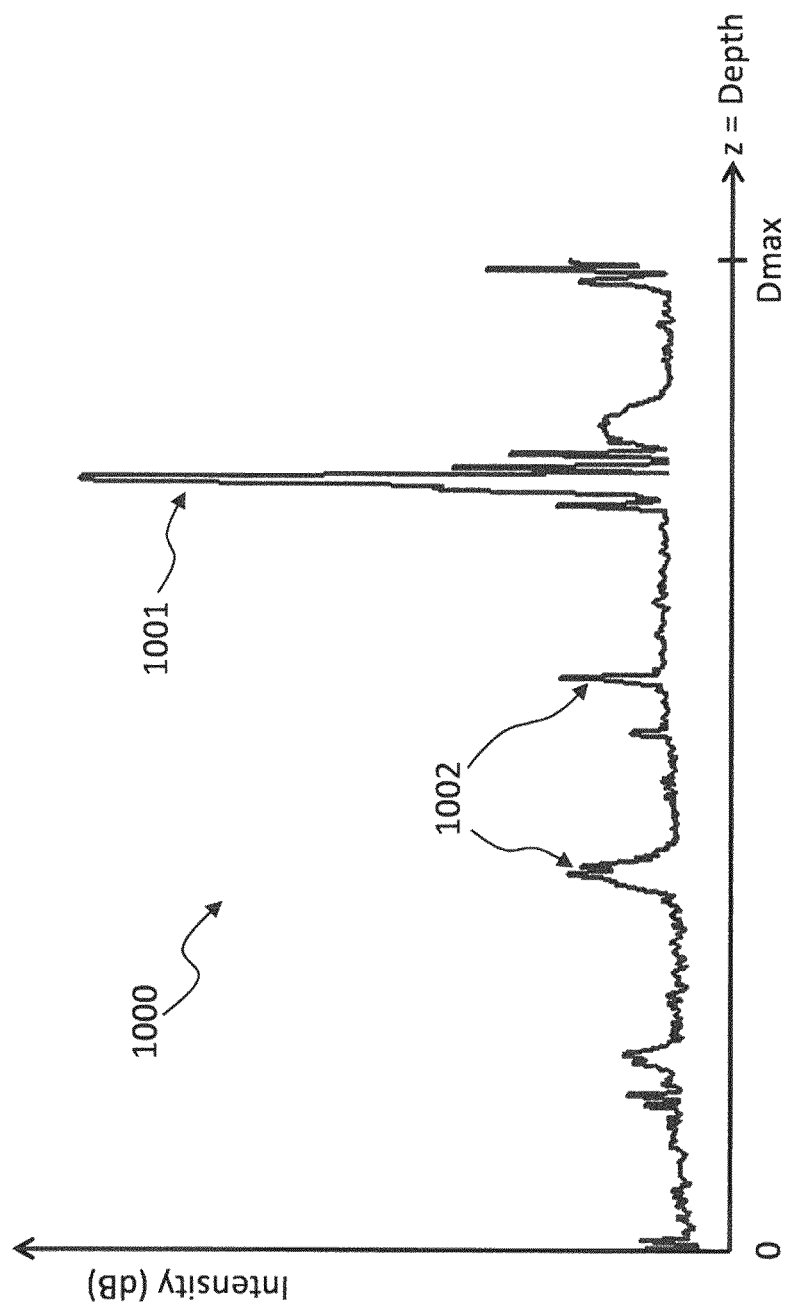
FIG. 2 is a diagram for explaining a conventional technology.
Figure 3:
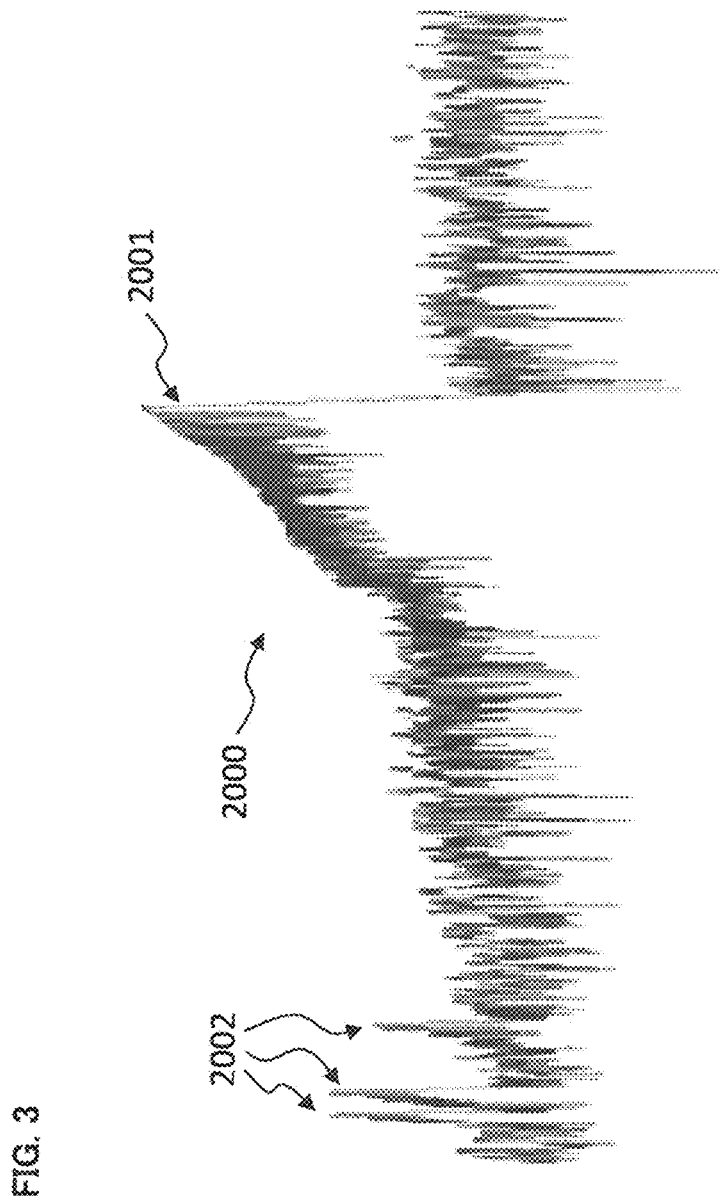
FIG. 3 is a diagram for explaining a conventional technology.

The affect of clock noise on images is explained. When the frequency of the clock noise is $f_{noise}$ and the amplitude is $A_{noise}$, the sampling points $k_n$ become non-linear, as in the following formula: $k_n=[n+A_{noise} \cos(2\pi \cdot n \cdot f_{noise}/f_{sample})] \cdot \Delta k$. Moreover, the sampled signals is expressed as in the following formula: $S_n=A_S \cdot \cos[2\pi \cdot Z_{signal}(n+A_{noise} \cos(2\pi \cdot f_{noise}/f_{sample})) \cdot \Delta k + \phi]$. Where, n=1, 2, 3, ..., N. The non-linearity of the sampling points $k_n$ generates noise corresponding to image artifacts (refer to the side peaks 1002 in FIG. 2).

Figure 7:
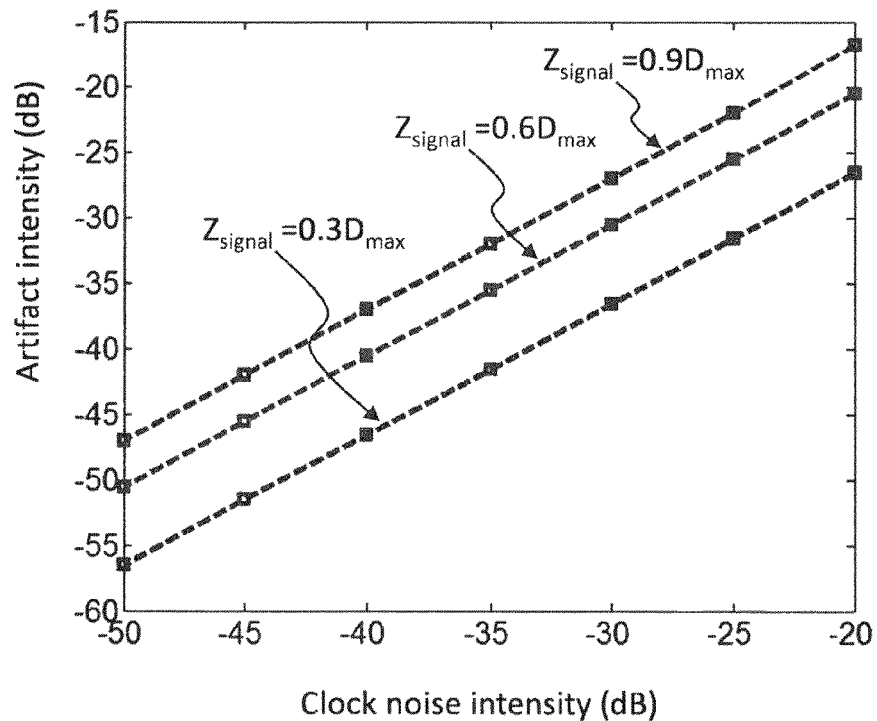
FIG. 7 is a diagram for explaining the principle of an image measuring method according to an embodiment.

As may be understood from the formula of the sampled signal $S_n$, the occurrence location and intensity of the artifact are given by the following three parameters.
(1) $Z_{signal}$: Signal depth
(2) $A_{noise}$: Clock noise amplitude
(3) $f_{noise}$: Clock noise frequency The effect of these parameters on artifacts will be explained. FIG. 7 illustrates the relation between the clock noise intensity and the artifact intensity when $Z_{signal}=0.9D_{max}$, $0.6D_{max}$, and $0.3D_{max}$. Further, $f_{noise}=0.05f_{sample}$ is set. The following may be understood from FIG. 7.
(1) The more $Z_{signal}$ approaches $D_{max}$, that is, the deeper the signal depth becomes, the stronger the artifact becomes.
(2) The artifact intensity is proportional to the clock noise amplitude (intensity) $A_{noise}$.

Figure 8:
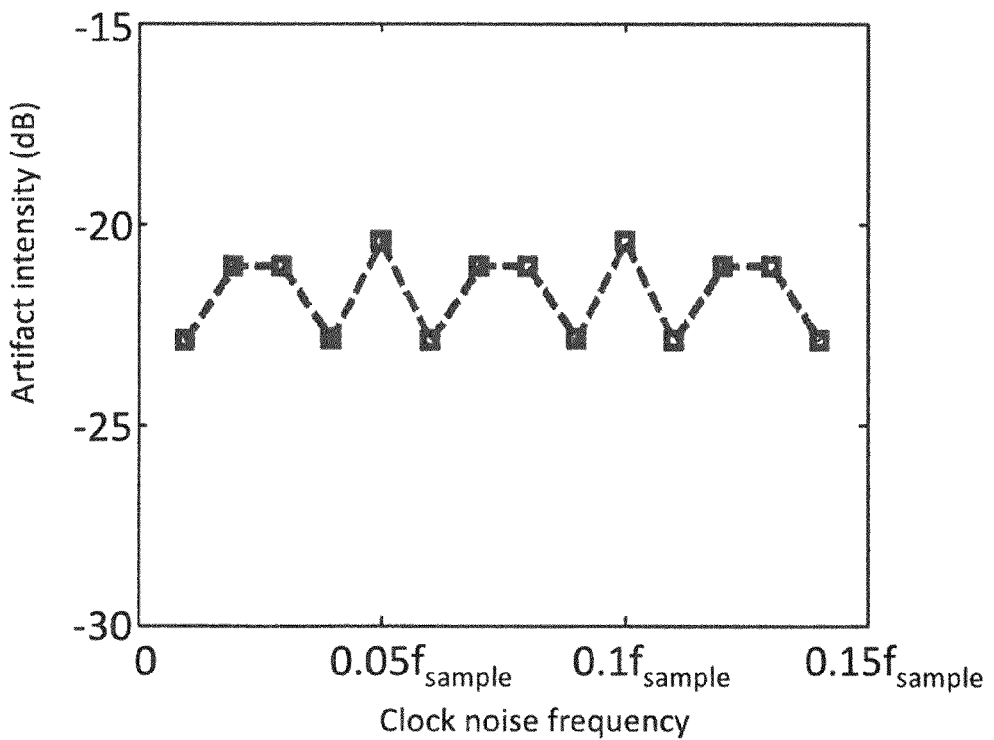
FIG. 8 is a diagram for explaining the principle of an image measuring method according to an embodiment.

FIG. 8 illustrates the relation between the clock noise frequency and the artifact intensity. Further, $Z_{signal}=0.6D_{max}$ and $A_{noise}=0.1$ are set. The following may be understood from FIG. 8.
(3) $f_{noise}$ has a smaller effect on the artifact compared to $Z_{signal}$ and $A_{noise}$. However, the artifact intensity periodically changes within a range of approximately 3 dB in accordance with the change in $f_{noise}$.

Figure 9:
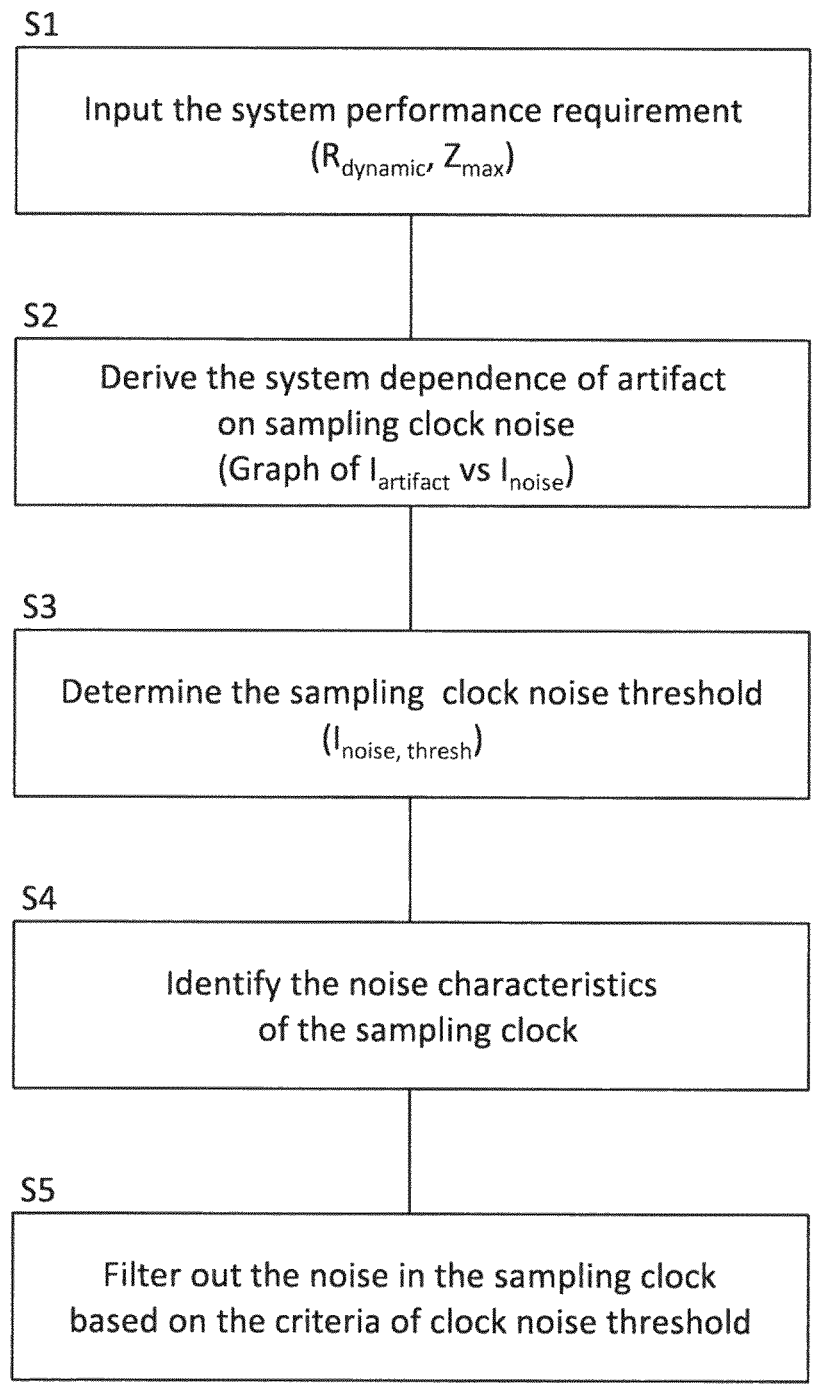
FIG. 9 is a flowchart indicating an image measuring method according to an embodiment.

The image measuring method according to the embodiment is based on the following findings 1 and 2 obtained from the observations above.
1. Artifact intensity is proportional to the intensity of the noise of clock signals.
2. Signals from the deepest layer in the measuring range affect the artifact the most <Image Measuring Method>
An example of the image measuring method according to the embodiment is illustrated in FIG. 9. This method includes a five-step process.
(S1) Inputting performance requirements (operating conditions) of the system
(S2) Obtaining dependence of artifacts with respect to clock noise in the system
(S3) Determining a threshold of the clock noise
(S4) Specifying the noise characteristics of the clock signals
(S5) Removing the clock noise based on the threshold of the clock noise It should be noted that regarding the processes prior to clock noise removal in Step 5, for example, the processes up to preparing a filter in Step 5, each step in the processes is explained as follows with reference to actual image measurements.
(S1: Input Performance Requirement)

The dynamic range $R_{dynamic}$ and effective imaging range $Z_{max}$ of the system are input. This process is carried out using, for example, an input device (not illustrated). It should be noted that when these parameters are constant, there is no need to carry out this process. Moreover, when the dynamic range $R_{dynamic}$ etc. depends on the type of object or other parameters, a configuration is possible in which the values of the dynamic range $R_{dynamic}$ etc. are automatically set based on the relation thereof determined in advance.
(S2: Derive the Relation Between the Clock Noise and the Artifact)

Information (intensity information) indicating the correspondence between the artifact intensity $I_{artifact}$ and the clock noise intensity $I_{noise}$ is obtained. The intensity information is represented as, for example, a graph indicating the change in the artifact intensity $I_{artifact}$ with respect to the clock noise intensity $I_{noise}$. This graph may be obtained by taking actual measurements. Instead, this graph may be obtained by performing a simulation based on the formula of the sampled signals $S_n$: $S_n=A_S \cdot \cos[2\pi \cdot Z_{signal}(n+A_{noise} \cos(2\pi \cdot n \cdot f_{noise}/f_{sample})) \cdot \Delta k + \phi]$.

Figure 10:
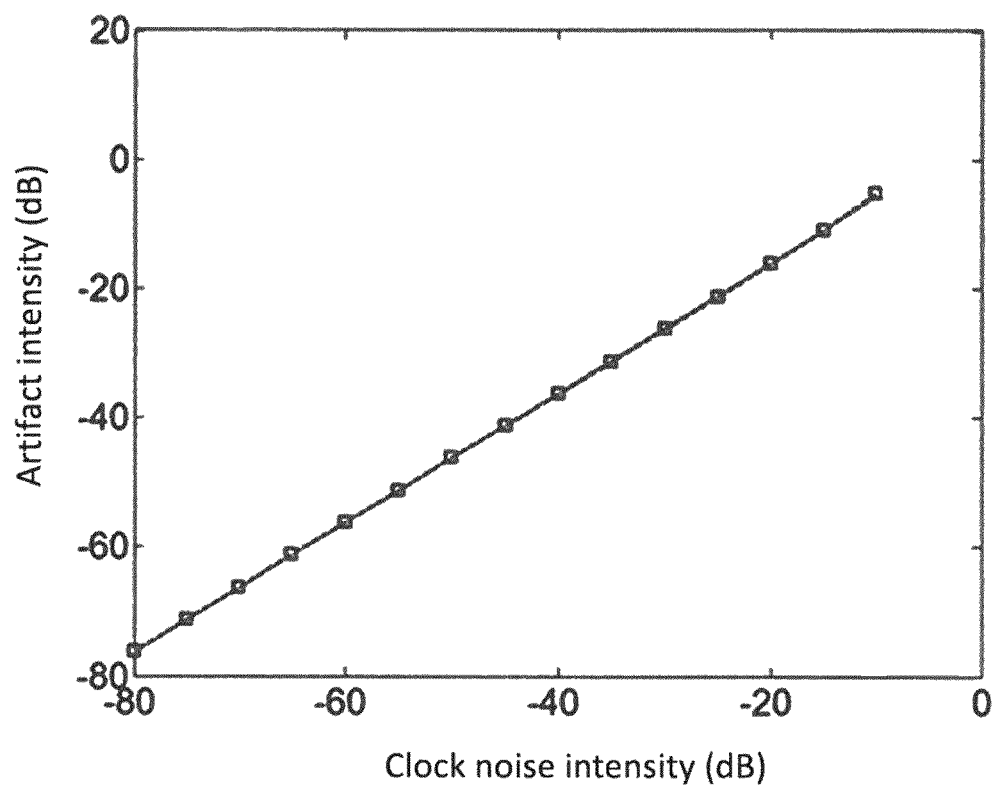
FIG. 10 is a diagram for explaining an image measuring method according to an embodiment.

As illustrated in FIG. 7, the signals corresponding to the maximum depth position in the effective imaging range $Z_{max}$ affect the artifact the most. Accordingly, the intensity information is preferably obtained based on the signals at this maximum depth position. An example of a graph obtained in this manner is illustrated in FIG. 10.
(S3: Determine the Threshold of the Clock Noise)

The clock noise threshold $I_{noise,thresh}$ may be determined using the operation conditions (dynamic range $R_{dynamic}$) input at Step 1. Instead, the threshold $I_{noise,thresh}$ may be determined using the graph obtained in Step 2. An example of the processing in this step is explained with reference to FIG. 11A and FIG. 11B.

Figure 11A:
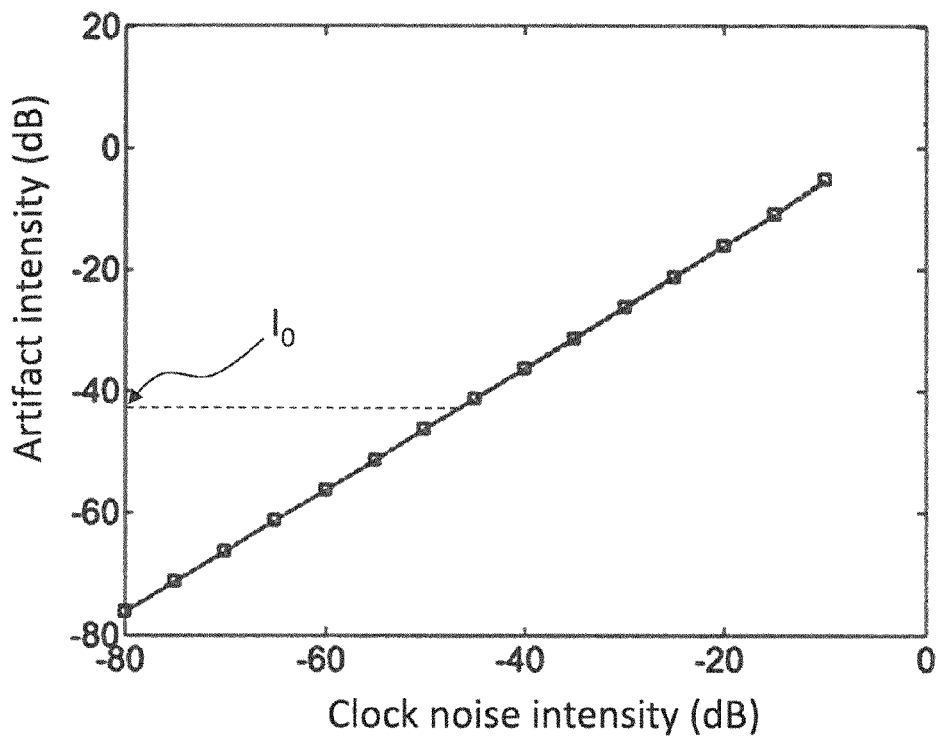
FIG. 11A is a diagram for explaining an image measuring method according to an embodiment.
Figure 11B:
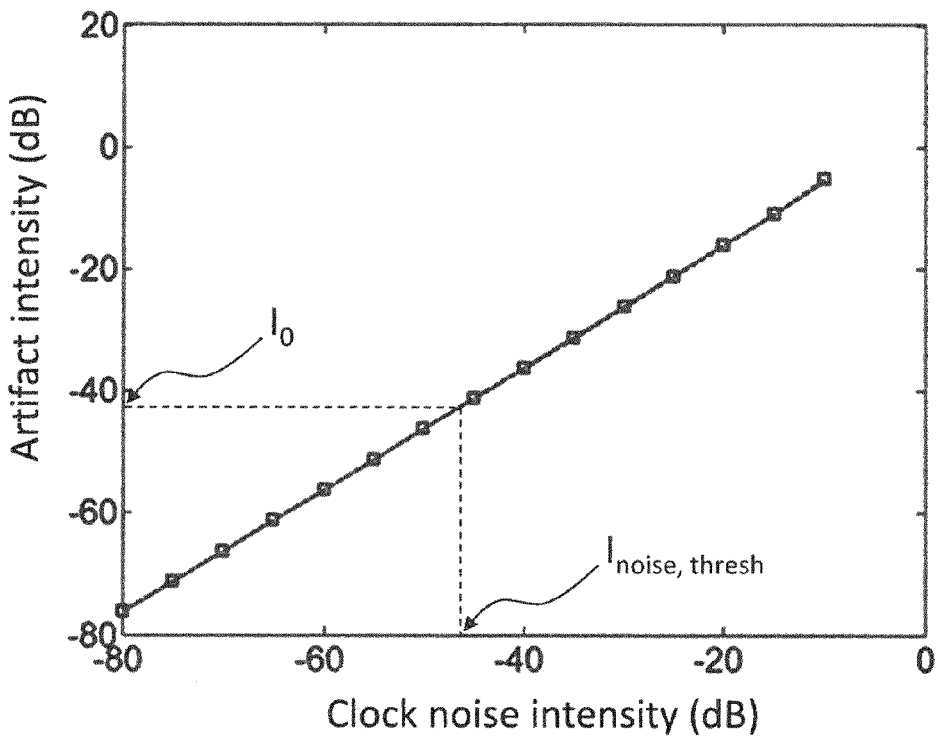
FIG. 11B is a diagram for explaining an image measuring method according to an embodiment.

First, a reference value $I_0$ of the artifact intensity is set based on the dynamic range $R_{dynamic}$ input at Step 1 (refer to FIG. 11A). The reference value $I_0$ is set by, for example, the following formula: $I_0=-R_{dynamic}$.

Next, the threshold $I_{noise,thresh}$ is determined based on the reference value $I_0$ set in the previous process and the graph obtained in Step 2 (refer to FIG. 10). Specifically, in this graph, the value of the clock noise intensity corresponding to the reference value $I_0$ is specified, and this is set as the threshold $I_{noise,thresh}$ (refer to FIG. 11B). This threshold $I_{noise,thresh}$ indicates the permissible value of noise in clock signals.
(S4: Identify the Noise Characteristics in Clock Signals)

Figure 12:
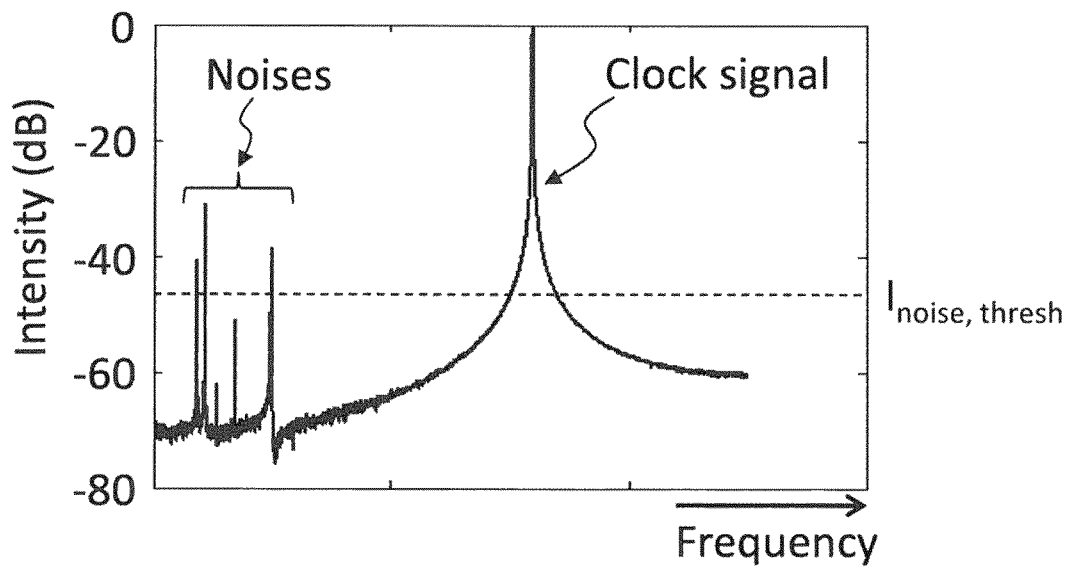
FIG. 12 is a diagram for explaining an image measuring method according to an embodiment.

The noise characteristics of clock signals may be specified based on, for example, a power spectrum of the clock signals obtained using a spectrum analyzer. Specifically, first, the spectrum of the clock signals is measured using the spectrum analyzer. Next, the distribution of noise other than the sampling frequency is specified based on the measured spectrum. Subsequently, the intensity of the specified noise is compared with the threshold $I_{noise,thresh}$ (refer to FIG. 12).
(S5: Remove the Clock Noise)

Figure 13:
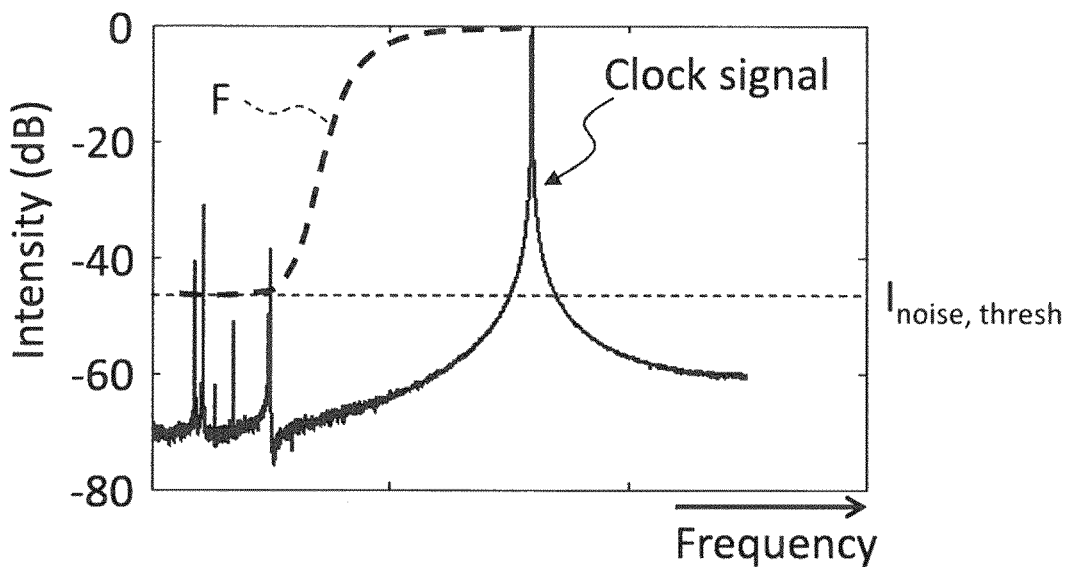
FIG. 13 is a diagram for explaining an image measuring method according to an embodiment.

The clock noise is removed based on the comparison between the noise intensity and the threshold $I_{noise,thresh}$ at Step 4. This process is carried out using, for example, a filter comprising the permeation characteristics indicated as symbol F in FIG. 13. The filter F is set such that it reduces the noise intensity to the threshold $I_{noise,thresh}$ or lower in the frequency range with the generation of noise, and it does not reduce the intensity in the frequency range corresponding to the clock signals.

The filter used in this step is configured to be a single filter or a combination of a plurality of filters. The filter used here includes a high-pass filter, a band pass filter, and/or a notch filter. As a specific example, a band pass filter transmitting a 100-500 MHz zone may be used.

When the noise is a common mode noise or when the noise includes a common mode noise, a balanced photo detector (balance detector) is effectively used.
<Image Measuring Apparatus>

The embodiment of the image measuring apparatus for realizing the abovementioned image measuring method is explained.
[Configuration]

Figure 14:
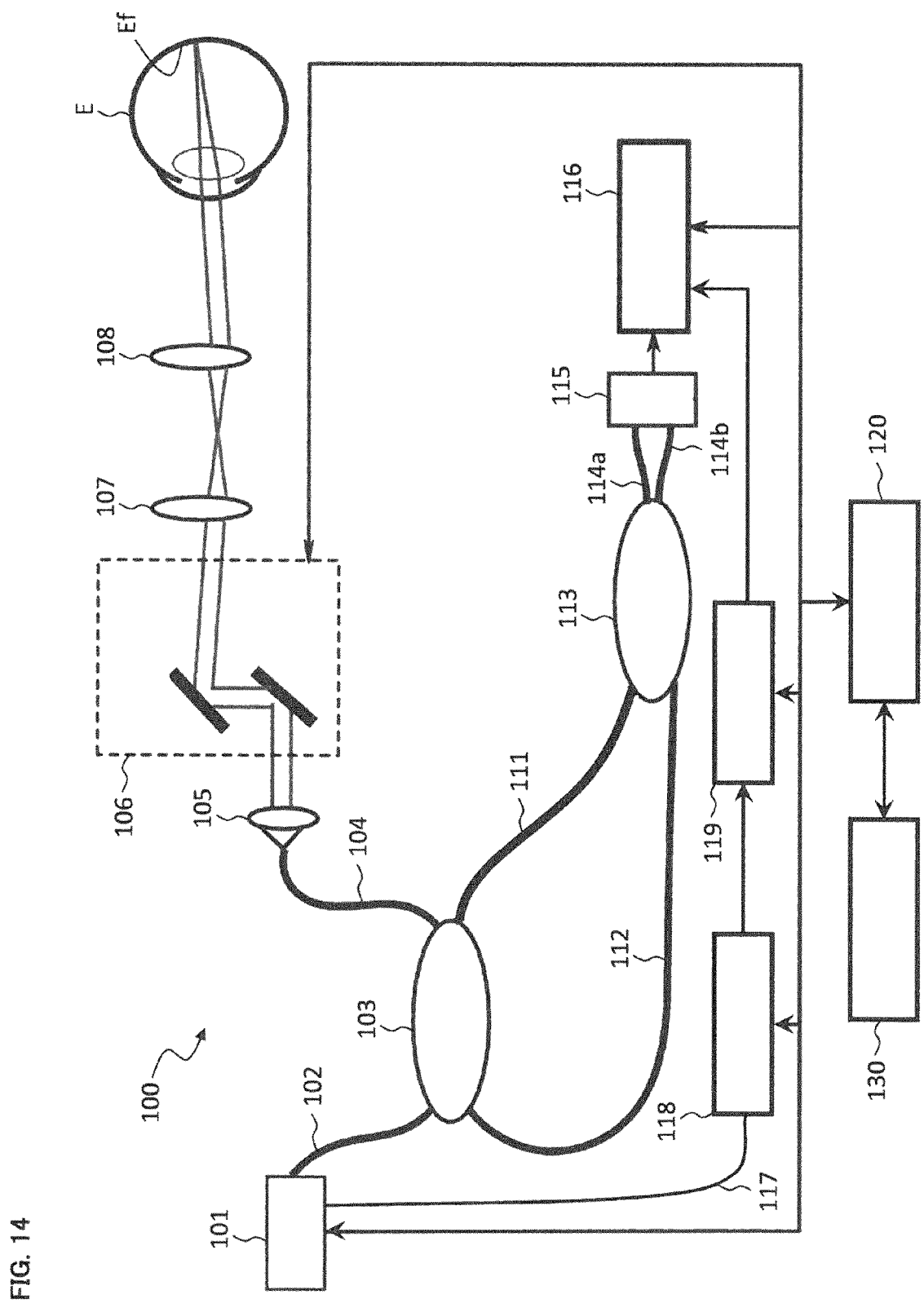
FIG. 14 is a diagram indicating an example of the configuration of an image measuring apparatus according to an embodiment.
Figure 15:
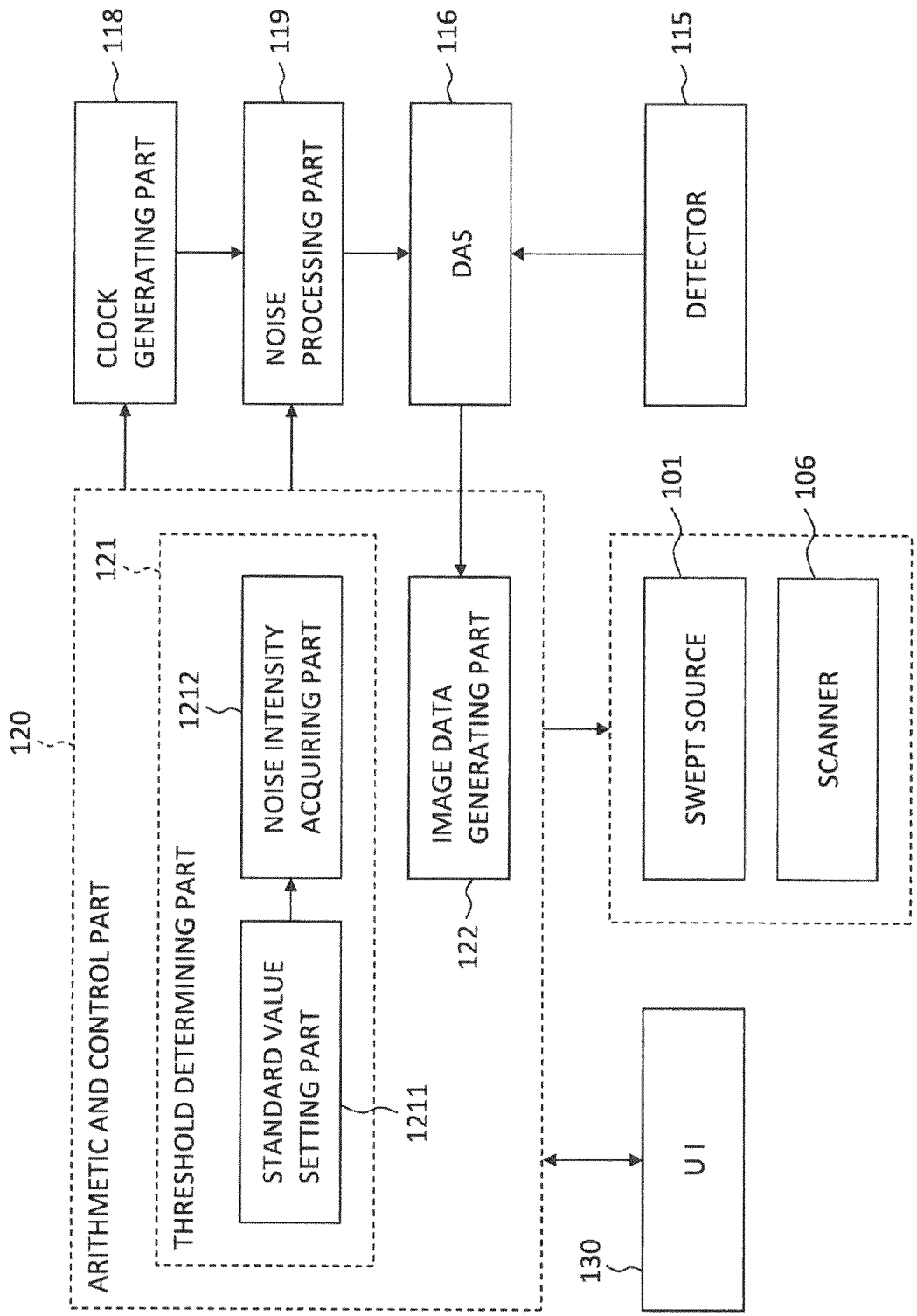
FIG. 15 is a diagram indicating an example of the configuration of an image measuring apparatus according to an embodiment.

A configuration example of the image measuring apparatus related to the embodiment is illustrated in FIG. 14 and FIG. 15. Here, the apparatus using the SS-OCT is explained; however, the similar configuration may be applied for apparatuses using SD-OCT and/or apparatuses using imaging methods other than OCT. The differences in such apparatuses are nothing more than general differences between imaging methods. For example, while a swept source and photodetector are used in SS-OCT, a broadband light source and spectrum detector are used in SD-OCT.

The optical imaging apparatus 100 comprises a wavelength sweep light source (swept source) 101 such as a variable wavelength laser. The swept source 101 outputs light while continuously changing wavelengths at high speed. The light output from the swept source 101 is led to a fiber coupler 103 via an optical fiber 102. The fiber coupler 103 connects four optical fibers 102, 104, 111 and 112. The light led via optical fiber 102 is divided into signal light and reference light by the fiber coupler 103. The signal light is radiated to the object and is also referred to as measurement light or sample light, etc. The reference light is synthesized with the signal light via a predetermined reference path. In this embodiment, the object is a fundus Ef of an eye E.

The signal light is led to the optical fiber 104 and is output from its fiber end to be made into parallel light flux by a collimator 105. After being made into parallel light flux, the signal light travels via a scanner 106, and is focused on the fundus Ef by means of lenses 107 and 108. The scanner 106 changes the irradiation position of the signal light onto the fundus Ef. As the scanner 106, a Galvano scanner, a polygon mirror, a resonant scanner, an acousto-optical modulator, a rotation prism, an oscillation prism, etc. is used. An optical path formed by the optical fiber 104, the collimator 105, the scanner 106, and the lenses 107 and 108 are referred to as a signal light path or a sample arm, etc.

The signal light projected onto the fundus Ef is scattered by various tissues of the fundus Ef. Back-scattered light among this scattered light returns to the fiber coupler 103 via the signal light path. Further, this back-scattered light is led to a fiber coupler 113 by an optical fiber 112. The back-scattered light includes information about the depth direction of the fundus Ef.

On the other hand, reference light generated by the fiber coupler 103 is led to a filter coupler 113 via an optical fiber 112. Such a path of the reference light is referred to as a reference light path or a reference arm, etc.

The fiber coupler 113 connects four optical fibers 111, 112, 114a, and 114b. The bifurcation ratio of the fiber coupler 113 is 1:1, for example. The signal light and the reference light are superimposed with each other by the fiber coupler 113 to generate interference light. This interference light takes over the information of the depth direction of the fundus Ef included in the signal light. The detector 115 detects the interference light led by the optical fibers 114a and 114b. The detector 115, for example, is a balanced detector having two photodetectors and outputs the difference in detection results of these photo detectors.

Every time the detector 115 detects interference light, it transmits the detection result thereof (detection signal) to a data acquisition system (DAS) 116. The data acquisition system 116 acquires the detection signals successively input from the detector 115. Moreover, the data acquisition system 116 carries out a process of sampling the analog detection signals, a process of transforming the sampled signals into digital signals, etc. Such processes are carried out with clock signals as the trigger thereof. The data acquisition system 116 assembles the acquired digital data for each series of wavelength sweeping, that is, for each A-line, and transmits the result thereof to the arithmetic and control part 120.

Figure 4:
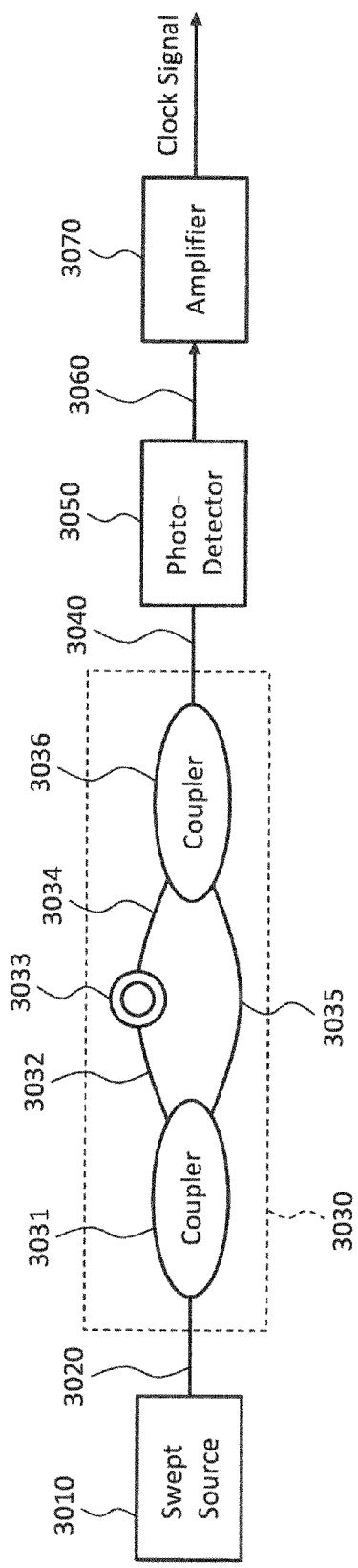
FIG. 4 is a diagram for explaining a conventional technology.
Figure 5:
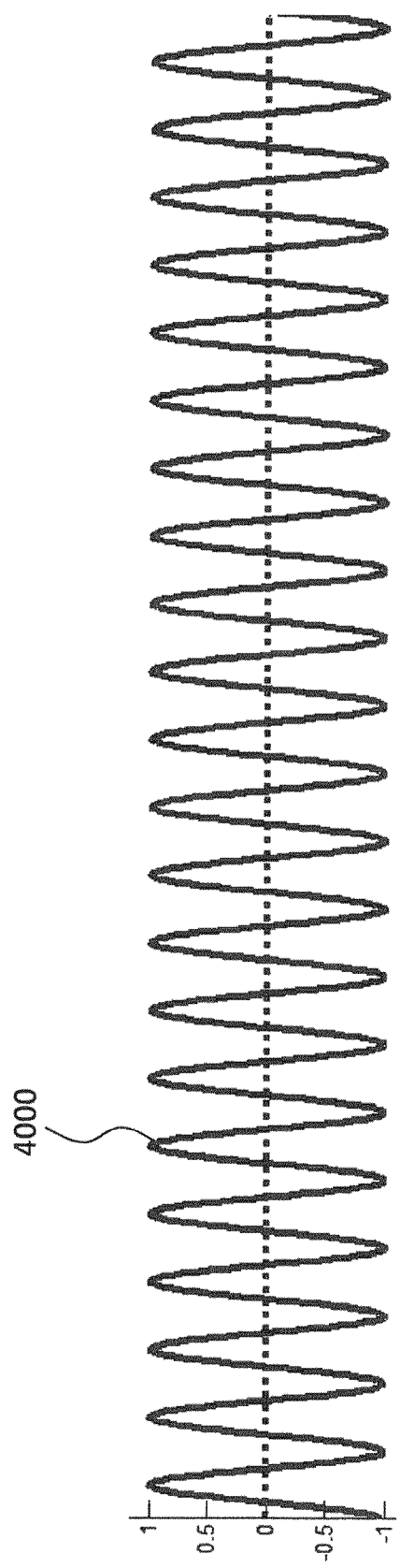
FIG. 5 is a diagram for explaining a conventional technology.
Figure 6:
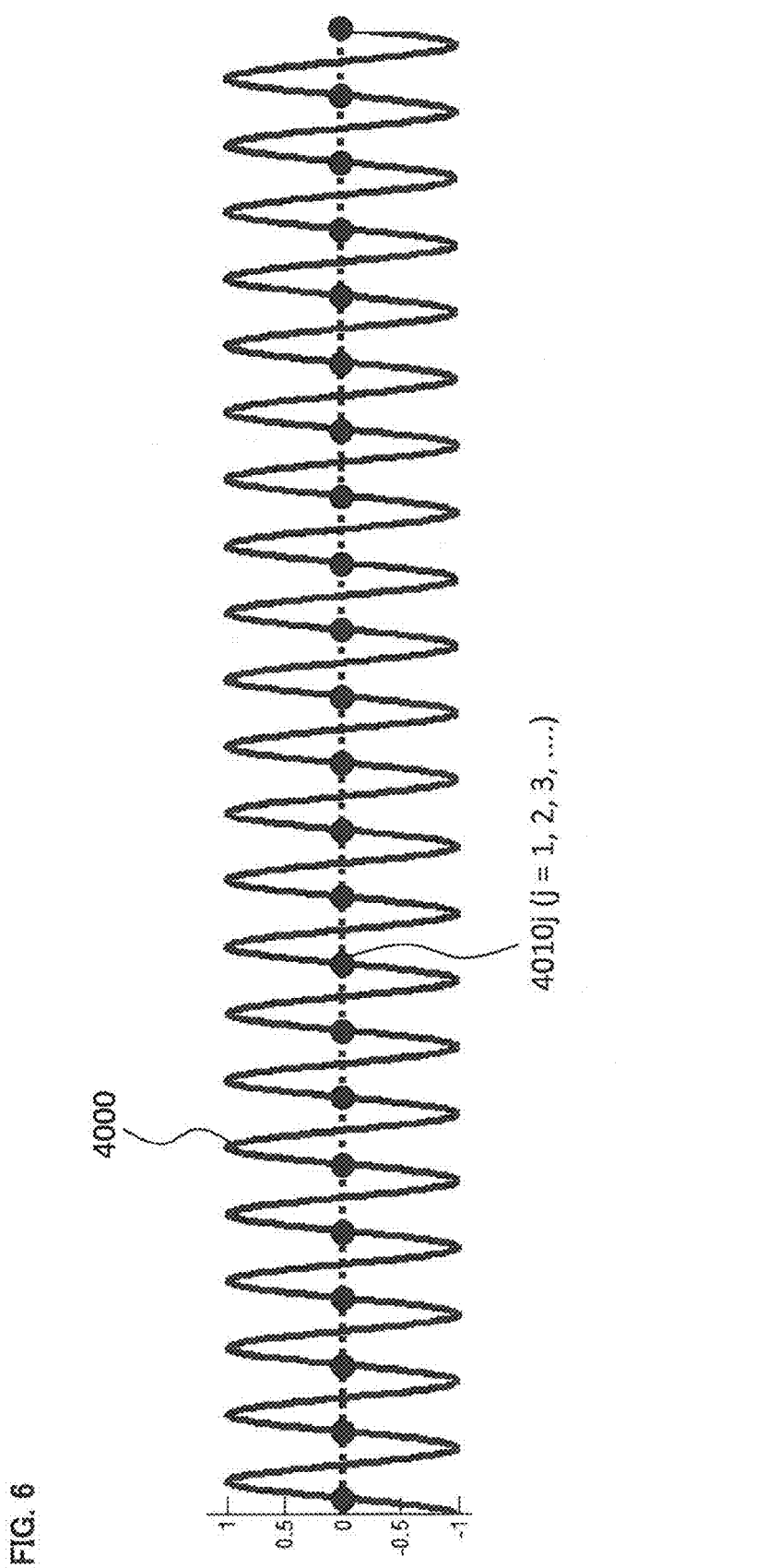
FIG. 6 is a diagram for explaining a conventional technology.

Clock signals input into the data acquisition system 116 are generated by the clock generating part 118 and noise processing part 119. The light output from the swept source 101 is input into the clock generating part 118 via the optical fiber 117. The clock generating part 118 generates clock signals based on this light. For example, the clock generating part 118 is configured to include, as illustrated in FIG. 4, the interferometer 3030, the optical fiber 3040, the photodetector 3050, the signal line 3060, and the amplifier 3070. Thereby, the clock signals as illustrated in FIG. 5 are generated.

The clock signals generated by the clock generating part 118 are input into the noise processing part 119. The clock signals contain noise. The noise processing part 119 reduces the noise of the clock signals generated by the clock generating part 118 to the threshold set in advance or lower. Regarding this threshold, the threshold mentioned above $I_{noise,thresh}$ may be applied. The noise processing part 119 reduces the clock noise by, for example, the filter having the permeation characteristics indicated as the symbol F in FIG. 13.

The clock signals with noise reduced by means of the noise processing part 119 are input into the data acquisition system 116. The data acquisition system 116 performs sampling of the detected signals (analog signals) input from the detector 115 with these clock signals as the trigger thereof. Further, the data acquisition system 116 generates digital data based on the data sampled from the detection signals. The generated digital data is input into the arithmetic and control part 120.

The arithmetic and control part 120 carries out various arithmetic processes and controls each part of the apparatus. The arithmetic and control part 120 comprises, for example, a microprocessor and a storage device. The storage device stores a dynamic range ($R_{dynamic}$) and effective imaging range ($Z_{max}$) of the image measuring apparatus 100 in advance. The arithmetic and control part 120 comprises the threshold determining part 121 and the image data generating part 122.

The threshold determining part 121 determines a threshold used for the clock noise reducing process by the noise processing part 119 based on the intensity information obtained in advance. As mentioned above, the intensity information indicates the correspondence between the clock signal noise intensity and the image artifact intensity. The intensity information is stored in advance in, for example, the storage device of the arithmetic and control part 120.

The threshold determining part 121 comprises a reference value setting part 1211 and a noise intensity acquiring part 1212. The reference value setting part 1211 sets the reference value ($I_0$) of the artifact intensity based on, for example, as explained in Step 3 of FIG. 9, the dynamic range ($R_{dynamic}$) stored in the storage device. As the reference value ($I_0$), for example, the negative value of the dynamic range ($R_{dynamic}$) value is used: $I_0 = -R_{dynamic}$.

The noise intensity acquiring part 1212 obtains the noise intensity corresponding to the reference value ($I_0$) set by the reference value setting part 1211 based on the intensity information. This process is, for example, as explained in Step 3 of FIG. 9, performed by specifying the value of the clock noise intensity corresponding to the reference value ($I_0$) in the intensity information. The value specified by this process is used as the threshold ($I_{noise,thresh}$).

By using the principle of SS-OCT, the image data generating part 122 reconstructs each A-line profile (A-line image) based on the digital data input from the data acquisition system 116. Further, the image data generating part 122 arranges the plurality of A-line profiles to one line in accordance with the scanning pattern of the signal light, thereby forming a B scan image (2-dimensional tomographic image). Moreover, the image data generating part 122 arranges the plurality of B scan images in accordance with the scanning pattern of the signal light to generate stack data, and performs image processing such as interpolation processing etc. on this stack data, thereby generating volume data.

A user interface (man-machine interface) 130 includes a display device, an input device, an operation device, etc. As a display device, LCD etc. is used. As an input device and an operation device, various hardware keys (a switch, a button, a knob, a joy stick, etc.) provided with the optical imaging apparatus 100 are considered.

Hardware keys arranged on an apparatus connected to the optical imaging apparatus 100 (for example, a key board, a pointing device provided to a computer, etc.) can be used as an input device and an operation device. Further, software keys displayed on the abovementioned display device and the abovementioned computer can also be used as an input device and an operation device.

<Actions and Effects>

Actions and effects of embodiments will be explained.

An image measuring method according to an embodiment comprises a clock generating step, a noise reducing step, a data acquisition step, a digital data generating step and an image data generating step. In the clock generating step, clock signals are generated. In the noise reducing step, the noise of the generated clock signals is reduced to a predetermined threshold or lower. In the data acquisition step, analog data indicating the inner morphology of an object is acquired. In the digital data generating step, digital data is generated by sampling the analog data based on the clock signals with reduced noise. In the image data generating step, image data of the object is generated by performing data processing including Fourier transform on the generated digital data.

An image measuring method according to an embodiment may comprise a threshold determining step. In the threshold determining step, the threshold used in the noise reducing step is determined based on intensity information indicating the correspondence between the noise intensity and the image artifact intensity of clock signals obtained in advance.

The threshold determining step may comprise the following steps. In the first step, a reference value of the intensity of an artifact that occurs in an image (image artifact intensity) is determined based on the preset dynamic range value. The reference value may be a value of the dynamic range value with a negative sign. In the second step, noise intensity corresponding to the set reference value based on the intensity information is obtained. The obtained noise intensity is used as the threshold.

It is possible to generate the intensity information based on the signals corresponding to the maximum depth position of an imaging range in the depth direction that is set in advance. This method is given by considering the fact that, as shown in FIG. 7, signals from the maximum depth position of the imaging range affect the artifact the most.

The noise reducing step may be performed using a filter that is configured to reduce the signal intensity in the frequency range of the noise component of the clock signals to the threshold or lower, while not reducing the signal intensity in the frequency range of the signal component.

In the data acquisition step, SS-OCT may be used. Specifically, in the data acquisition step using SS-OCT, light output from a swept source is divided into signal light and reference light, interference light between the signal light returned from the object and the reference light is generated, and the interference light is detected to obtain analog signals.

In the data acquisition step, SD-OCT may be used. Specifically, in the data acquisition step using SD-OCT, light output from a broadband light source is divided into signal light and reference light, interference light between the signal light returned from the object and the reference light is generated, the interference light is spectrally resolved, and the spectrum distribution thereof is detected to obtain analog signals.

According to the image measuring methods according to embodiments, it is possible to suppress image artifacts caused by noises in clock signals.

Moreover, the threshold can be obtained based on the intensity information and the dynamic range, it is possible to quantitatively suppress image artifacts Furthermore, artifacts can be effectively reduced by generating the intensity information based on the signals corresponding to the maximum depth position in the imaging range.

An image measuring apparatus (100) according to an embodiment comprises a clock generating part (118), a noise processing part (119), a data acquisition part (optical system shown in FIG. 14 and a DAS 116), and an image data generating part (122). The clock generating part is configured to generate clock signals. The noise processing part is configured to reduce the noise of the generated clock signals to the predetermined threshold or lower. The data acquisition part is configured to acquire analog data indicating the inner morphology of the object, and to sample the analog data based on the clock signals with reduced noise, thereby generating digital data. The image data generating part is configured to perform data processing including Fourier transform on the generated digital data, thereby generating image data of the object.

The threshold used by the noise processing part 119 is determined, for example, based on intensity information indicating the correspondence between the noise intensity and the image artifact intensity of clock signals obtained in advance.

An image measuring apparatus according to an embodiment may further comprises a threshold determining part (121). The threshold determining part 121 is configured to determine the threshold used by the noise processing part 119 based on the intensity information.

The threshold determining part 121 may comprises a reference value setting part 1211 and a noise intensity acquiring part 1212. The reference value setting part 1211 is configured to set a reference value of the image artifact intensity based on the preset dynamic range value. A value of the dynamic range value with a negative sign may be used as the reference value. The noise intensity acquiring part 1212 is configured to acquire noise intensity corresponding to the reference value based on the intensity information. The acquired noise intensity is set as the threshold.

It is possible to generate the intensity information based on the signals corresponding to the maximum depth position of an imaging range in the depth direction that is set in advance. This method is given by considering the fact that, as shown in FIG. 7, signals from the maximum depth position of the imaging range affect the artifact the most.

The noise processing part 119 reduces the noise in the clock signals by, for example, using a filter that reduces the signal intensity in the frequency range of the noise component of the clock signals to the threshold or lower, while not reducing the signal intensity in the frequency range of the signal component.

The data acquisition part may be configured to use SS-OCT to execute measurement of an object. In this case, an image measuring apparatus comprises a swept source(s), an interference optical system and a photoelectric conversion element(s). The swept source (101) is configured to output light while continuously changing wavelengths at high speed. The interference optical system is configured to divide the light output from the swept source (101) into signal light and reference light, and generate interference light between the signal light via the object and the reference light. In the configuration example indicated in FIG. 14, the interference optical system comprises the optical fiber 102, the fiber coupler 103, the optical fiber 104, the collimator 105, the scanner 106, the lenses 107 and 108, the optical fibers 111 and 112, the fiber coupler 113, and the optical fibers 114a and 114b. The photoelectric conversion element is configured to detect the interference light and generate analog signals. In the configuration example indicated in FIG. 14, the detector 115 corresponds to the photoelectric conversion element.

The data acquisition part may be configured to use SD-OCT to execute measurement of an object. In this case, an image measuring apparatus comprises a broadband light source, an interference optical system and a spectrometer. The broadband light source is configured to output broadband light. As the broadband light source, a superluminescent diode (SLD) is used, for example. In the configuration example indicated in FIG. 14, the broadband light source is arranged in place of the swept source 101. The interference optical system is configured to divide the light output from the broadband light source into signal light and reference light, and generate interference light between the signal light via the object and the reference light. This interference optical system may comprise a similar configuration to that shown in FIG. 14. The spectrometer is configured to spectrally resolve the interference light generated by the interference optical system, and detect the spectrum distribution thereof to generate analog signals. The spectrometer comprises a optical element that spectrally resolve interference light (for example, a diffraction grating), and photoelectric conversion elements that detect the spectrally resolved interference light (for example, a line sensor). In the configuration example indicated in FIG. 14, the spectrometer is used as the detector 115.

According to the image measuring methods according to embodiments, it is possible to suppress image artifacts caused by noises in clock signals.

Moreover, the threshold can be obtained based on the intensity information and the dynamic range, it is possible to quantitatively suppress image artifacts Furthermore, artifacts can be effectively reduced by generating the intensity information based on the signals corresponding to the maximum depth position in the imaging range.

Modified Example

The embodiments explained above are only exemplifications, and are not intended to limit the scope of the invention. A person intending to implement this invention may make any modifications within the scope of the present invention. These embodiments and the modifications thereof are included in the scope of the present invention and the equivalents thereof. Some examples of modification are indicated as follows.

In order to ensure the effect of artifact suppression, it is important to maintain the k-space linearity, that is, to linearly sample the spectral interferogram in a wavelength space. There are times when the linearity in the k-space deteriorates due to, for example, the non-linearity of wavelength modulation of the swept source. Accordingly, the clock signals become broadband signals in the frequency space, working against the clock noise specifying process. In such cases, interpolation processing and/or re-sampling are preferably performed prior to the clock noise specifying process such that the clock signals become linear in the k-space. Methods for giving k-space linearity to the clock signals include methods by means of software and methods by means of hardware.

As an example of a method by means of software, interpolation and/or re-sampling of clock signals may be performed by executing linearization of the instantaneous phase of the clock signals.

As an example of a method by means of hardware, interpolation and/or re-sampling of clock signals may be performed by using other signals with a frequency which is equal to or more than the double of that of the clock signals.

Figure 16A:
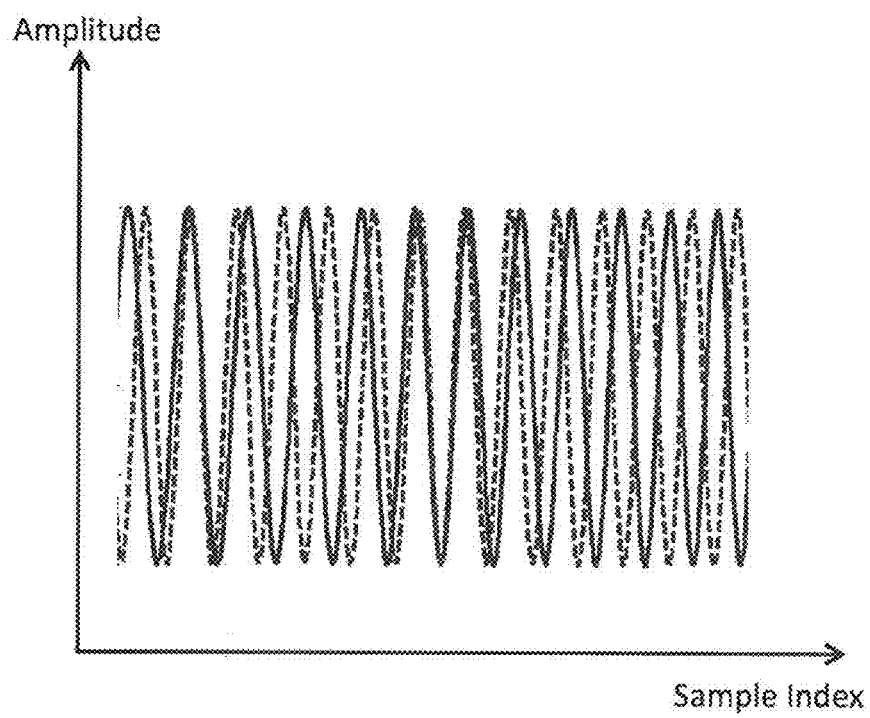
FIG. 16A is a diagram for explaining an image measuring method according to a modified example.
Figure 16B:
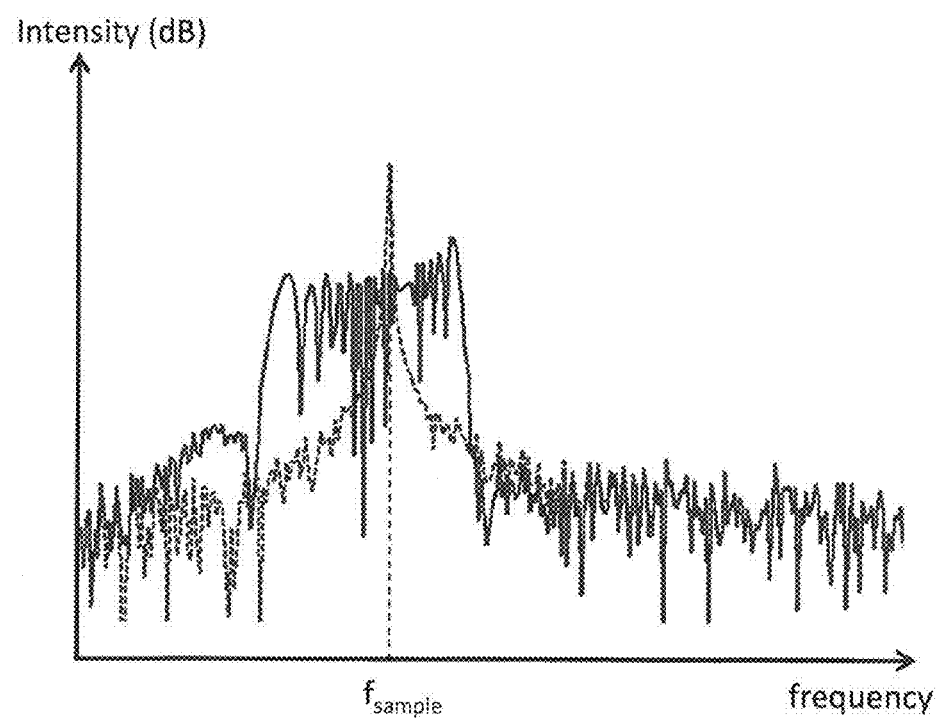
FIG. 16B is a diagram for explaining an image measuring method according to a modified example.

The effects of such interpolation processing and re-sampling are illustrated in FIG. 16A and FIG. 16B. FIG. 16A illustrates the difference in waveforms of the clock signals between the presence and absence of k-space linearity. The waveform illustrated in FIG. 16A with the solid curve indicates the waveform of clock signals without k-space linearity. Meanwhile, the waveform illustrated with the dashed curve indicates the waveform of clock signals with k-space linearity that is obtained by performing the abovementioned process to correct the clock signals indicated with this solid curve. FIG. 16B illustrates the difference in the frequency distribution of clock signals between the presence and absence of k-space linearity. The waveform illustrated in FIG. 16B with the solid curve indicates the frequency distribution of clock signals without k-space linearity. Meanwhile, the waveform illustrated with the dashed curve indicates the frequency distribution of the clock signals with k-space linearity that is obtained by performing the abovementioned process to correct the clock signals indicated with this solid curve. Here, $f_{sample}$ indicates the frequency of the clock signals.

EXPLANATION OF SYMBOLS 100 image measuring apparatus
101 swept source
103, 113 fiber coupler
115 detector
116 data acquisition system
118 clock generating part
119 noise processing part
120 arithmetic and control part
121 threshold determining part
1211 standard value setting part
1212 noise intensity acquiring part
122 image data generating part
130 user interface

What is claimed is:
1. An image measuring method comprising:
a clock generating step that generates clock signals;
a noise reducing step that reduces the noise of the generated clock signals to a predetermined threshold or lower;
a data acquisition step that acquires analog data indicating the inner morphology of an object;
a digital data generating step that samples the analog data based on the clock signals with reduced noise to generate digital data;
an image data generating step that performs data processing including Fourier transform on the generated digital data, thereby generating image data of the object; and
a threshold determining step that determines the threshold based on intensity information indicating the correspondence between noise intensity and image artifact intensity of clock signals obtained in advance,
wherein the intensity information is generated based on the signals corresponding to a maximum depth position of an imaging range in the depth direction that is set in advance.

2. The image measuring method according to claim 1, wherein
the threshold determining step comprises the steps of:
determining a reference value of the image artifact intensity based on a dynamic range value set in advance; and
obtaining noise intensity corresponding to the reference value based on the intensity information; wherein
the obtained noise intensity is set as the threshold.

3. The image measuring method according to claim 2, wherein
the reference value is a value of the dynamic range value with a negative sign.

4. The image measuring method according to claim 1, wherein
the noise reducing step is performed using a filter that reduces the signal intensity in the frequency range of the noise component of the clock signals to the threshold or lower, while not reducing the signal intensity in the frequency range of the signal component.

5. The image measuring method according to claim 1, wherein
in the data acquisition step, light output from a swept source is divided into signal light and reference light, interference light between the signal light via the object and the reference light is generated, and the interference light is detected to obtain analog signals.

6. The image measuring method according to claim 1, wherein
in the data acquiring step, light output from a broadband light source is divided into signal light and reference light, interference light between the signal light via the object and the reference light is generated, the interference light is spectrally resolved, and its spectrum distribution is detected to obtain analog signals.

7. An image measuring apparatus, comprising:
a clock generating part configured to generate clock signals;
a noise processing part configured to reduce the noise of the generated clock signals to a predetermined threshold or lower;
a data acquisition part configured to acquire analog data indicating the inner morphology of the object, and to sample the analog data based on the clock signals with reduced noise to generate digital data; and
an image data generating part configured to perform data processing including Fourier transform on the generated digital data, thereby generating image data of the object,
wherein the threshold is determined based on intensity information indicating the correspondence between noise intensity and image artifact intensity of clock signals obtained in advance, and
the intensity information is generated based on the signals corresponding to a maximum depth position of an imaging range in the depth direction that is set in advance.

8. The image measuring apparatus according to claim 7, further comprising
a threshold determining part configured to determine the threshold based on the intensity information.

9. The image measuring apparatus according to claim 8, wherein
the threshold determining part comprises:
a reference value setting part configured to set a reference value of the image artifact intensity based on a dynamic range value set in advance; and
a noise intensity acquiring part configured to acquire noise intensity corresponding to a reference value based on the intensity information; wherein
the threshold determining part sets the acquired noise intensity as the threshold.

10. The image measuring apparatus according to claim 9, wherein
the reference value setting part sets a value of the dynamic range value with a negative sign as the reference value.

11. The image measuring apparatus according to claim 7, wherein
the noise processing part uses a filter that reduces the signal intensity in the frequency range of the noise component of the clock signals to the threshold or lower, while not reducing the signal intensity in the frequency range of the signal component, thereby reducing the noise in the clock signals.

12. The image measuring apparatus according to claim 7, wherein
the data acquisition part comprises:
a swept source;
an interference optical system configured to divide light output from the swept source into signal light and reference light, and generate interference light between the signal light via the object and the reference light; and
a photoelectric conversion element configured to detect the interference light and generate analog signals.

13. The image measuring apparatus according to claim 7, wherein the data acquisition part comprises:
a broadband light source;
an interference optical system configured to divide light output from the broadband light source into signal light and reference light, and generate interference light between the signal light via the object and the reference light; and
a spectrometer configured to spectrally resolve the interference light and detect the spectrum distribution thereof to generate analog signals.

* * * * *